(12) United States Patent
Wu et al.

(10) Patent No.: US 10,083,644 B2
(45) Date of Patent: Sep. 25, 2018

(54) PANEL CONTROL SYSTEMS AND DISPLAY DEVICES

(71) Applicant: Shenzhen China Star Optoelectronics Technology Co., Ltd., Shenzhen, Guangdong (CN)

(72) Inventors: Yu Wu, Guangdong (CN); Lei Sun, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 165 days.

(21) Appl. No.: 14/903,593

(22) PCT Filed: Dec. 25, 2015

(86) PCT No.: PCT/CN2015/098971
§ 371 (c)(1),
(2) Date: Jan. 7, 2016

(87) PCT Pub. No.: WO2017/088234
PCT Pub. Date: Jun. 1, 2017

(65) Prior Publication Data
US 2017/0278442 A1    Sep. 28, 2017

(30) Foreign Application Priority Data

Nov. 24, 2015 (CN) .......................... 2015 1 0825127

(51) Int. Cl.
*G09G 3/20* (2006.01)
*H04N 21/2343* (2011.01)
*H04N 21/258* (2011.01)

(52) U.S. Cl.
CPC ........... *G09G 3/20* (2013.01); *H04N 21/2343* (2013.01); *H04N 21/25825* (2013.01); *G09G 2310/02* (2013.01); *G09G 2320/06* (2013.01)

(58) Field of Classification Search
CPC .. G09G 3/20; G09G 2310/02; G09G 2320/06; H04N 21/2343; H04N 21/25825
(Continued)

(56) References Cited

U.S. PATENT DOCUMENTS

2004/0160433 A1   8/2004  Shigeta et al.
2006/0103619 A1*  5/2006  Kim ..................... G09G 3/3677
                                                                    345/98
(Continued)

FOREIGN PATENT DOCUMENTS

CN    1649387 A  *  8/2005
CN    1649387 A     8/2005
(Continued)

*Primary Examiner* — Stephen G Sherman
(74) *Attorney, Agent, or Firm* — Andrew C. Cheng

(57) ABSTRACT

A display panel control system and a display device are disclosed. The control system includes a system chip is configured for receiving video signals and for analyzing the video signals to obtain driving signals and timing signals, and a driving control board is configured for receiving the driving signals and the timing signals, and for controlling a display panel to display in accordance with the driving signals and the timing signals. The control system integrates the function of obtaining the driving signals and the timing signals on the system chip so as to simplify the structure of the display panel control system and to reduce the manufacturing cost.

16 Claims, 2 Drawing Sheets

(58) Field of Classification Search
USPC .......................................................... 345/204
See application file for complete search history.

(56) References Cited

U.S. PATENT DOCUMENTS

2010/0264952 A1* 10/2010 Abe ....................... G09G 3/006
  326/8
2010/0265246 A1   10/2010 Chen
2013/0088525 A1    4/2013 Qiu

FOREIGN PATENT DOCUMENTS

| CN | 101996544 A |   | 3/2011 |
| CN | 102509539 A | * | 6/2012 |
| CN | 102509539 A |   | 6/2012 |
| JP | 2008083589 A |  | 4/2008 |

* cited by examiner

PANEL CONTROL SYSTEMS AND DISPLAY DEVICES

BACKGROUND OF THE INVENTION

1. Field of the Invention

The present disclosure relates to display technology, and more particularly to a panel control system and a display device.

2. Discussion of the Related Art

Displays are mainly used to display images or videos. In general, images or video signals are of unified formats, but displays may have their own formats. Therefore, a control system has to be configured such that different panels may display the video signals of the unified formats. The control system is configured to process the video signals and to control the displays in accordance with the processed data.

FIG. 1 is a schematic view of one conventional panel control system. The panel control system 100 includes a system chip 11, a driving control board 12, a timing control board 13, and a power board 14. The power board 14 connects with the system chip 11 to provide the voltage for the panel control system 100. The system chip 11 is configured for converting the format of the video signals to be LVDS/VBO, and for transmitting the video signals into the timing control board 13. The timing controller 131 of the timing control board 13 process the video signals of the LVDS/VBO in accordance with the characteristics of the panel to obtain the control signals and the timing signals of mini-LVDS format, and then the signals are transmitted to the driving control board 12. The driving control board 12 then transmits the signals to the data lines and the scanning lines of the panel so as to implement the display function. The system chip 11 is generally manufactured by system manufactures. The driving control board 12 and the timing control board 13 are manufactured by the system manufacturers in accordance with the characteristics of the panel. The display panel control system may be of complex structure and high cost for the reason that the display panel control system has to connect the interfaces of the system chip 11, the driving control board 12, and the timing control board 13.

SUMMARY

The object of the invention is to provide a display panel control system and a display device to overcome the above issues.

In one aspect, a display panel control system includes: a system chip is configured for receiving video signals and for analyzing the video signals to obtain driving signals and timing signals; a driving control board is configured for receiving the driving signals and the timing signals, and for controlling a display panel to display in accordance with the driving signals and the timing signals; the driving control board stores time parameters and optical parameters corresponding to the display panel; the system chip further reads the time parameters and the optical parameter, and analyzes the video signals, the time parameters and the optical parameter to obtain the driving signals and the timing signals; and the system chip includes at least one P2P interface, and the system chip connects with the driving control board via the P2P interface.

Wherein the driving control board stores the time parameter and the optical parameters within EEPROM.

In another aspect, a display panel control system includes: a system chip is configured for receiving video signals and for analyzing the video signals to obtain driving signals and timing signals; and a driving control board is configured for receiving the driving signals and the timing signals, and for controlling a display panel to display in accordance with the driving signals and the timing signals.

Wherein the driving control board stores time parameters and optical parameters corresponding to the display panel; and the system chip further reads the time parameters and the optical parameter, and analyzes the video signals, the time parameters and the optical parameter to obtain the driving signals and the timing signals.

Wherein the driving control board stores the time parameter and the optical parameters within EEPROM.

Wherein the system chip includes at least one P2P interface, and the system chip connects with the driving control board via the P2P interface.

Wherein the driving signals and the timing signals are of P2P format.

Wherein the system chip includes at least one HDMI interface, and the system chip receives the video signals via the HDMI interface.

Wherein the system further includes at least two driving control boards, at least two driving control boards are connect in pairs, and the system chip connects to one of the at least two driving control boards.

Wherein every two of the at least two driving control boards are connected by the P2P interface.

Wherein the system further includes a power board connecting with the system chip.

In another aspect, a display device includes: a display panel and a display panel control system controlling the display panel to display, the display panel control system includes: a system chip is configured for receiving video signals and for analyzing the video signals to obtain driving signals and timing signals; and a driving control board is configured for receiving the driving signals and the timing signals, and for controlling the display panel to display in accordance with the driving signals and the timing signals.

Wherein the driving control board stores time parameters and optical parameters corresponding to the display panel; and the system chip further reads the time parameters and the optical parameter, and analyzes the video signals, the time parameters and the optical parameter to obtain the driving signals and the timing signals.

Wherein the driving control board stores the time parameter and the optical parameters within EEPROM.

Wherein the system chip includes at least one P2P interface, and the system chip connects with the driving control board via the P2P interface.

Wherein the driving signals and the timing signals are of P2P format.

Wherein the system chip includes at least one HDMI interface, and the system chip receives the video signals via the HDMI interface.

Wherein the system further includes at least two driving control boards, at least two driving control boards are connect in pairs, and the system chip connects to one of the at least two driving control boards.

Wherein every two of the at least two driving control boards are connected by the P2P interface.

Wherein the system further includes a power board connecting with the system chip.

In view of the above, the display panel control system includes the system chip and the driving control board. The system chip is configured for receiving the video signals, and analyzing the video signals to obtain the driving signals and the timing signals. The driving control board controls the display panel to perform display in accordance with the driving signals and the timing signals. The system chip is capable of obtaining the driving signals and the timing signals via analyzing the video signals directly. The system chip within the control system connects with the driving control board via the interfaces. Such configuration is simple, and the manufacturing cost is relatively low.

DETAILED DESCRIPTION OF THE EMBODIMENTS

Embodiments of the invention will now be described more fully hereinafter with reference to the accompanying drawings, in which embodiments of the invention are shown.

Figure 1:
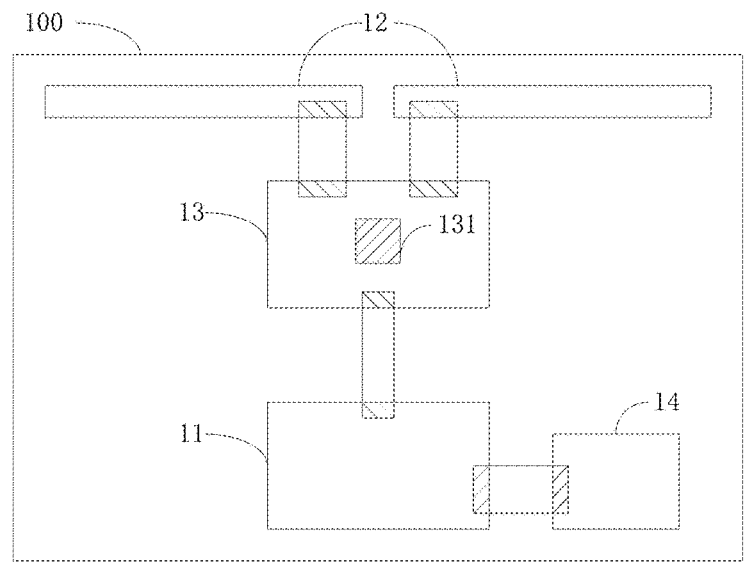
FIG. 1 is a schematic view of one conventional panel control system.
Figure 2:
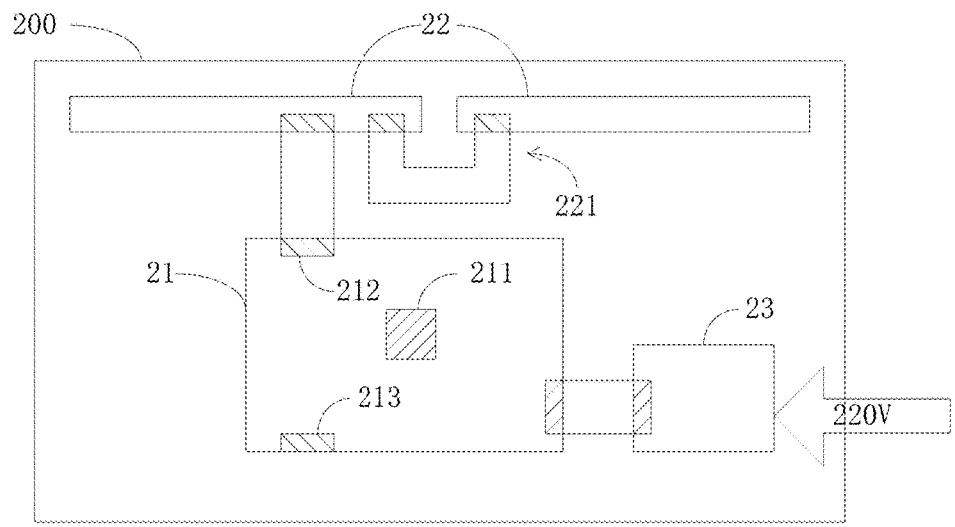
FIG. 2 is a schematic view of the display panel control system in accordance with one embodiment.

FIG. 2 is a schematic view of the display panel control system in accordance with one embodiment. The display panel control system 200 includes a system chip 21 and a driving control board 22.

The system chip 21 is configured for receiving the video signals, and processes the video signals to obtain driving signals and timing signals. The driving control board 22 is configured for receiving the driving signals and the timing signals, and for controlling the display panel to display in accordance with the driving signals and the timing signals.

In the embodiment, the function of the timing controller is integrated on the system chip 21, which is an integration product called as system on a chip (SOC). The SOC relates to the technology, wherein an integrated controller has been encapsulated with a plurality of solutions for accomplishing a variety of functions. In the embodiment, the system chip 21 includes a video controller 211 integrated thereon to process the video contents of the video signals.

In the embodiment, the function of the timing controller is accomplished by the system chip 21 in two ways. First, the timing controller is integrated as one module on the system chip 21. Second, the core circuit of the timing controller is integrated within the video controller 211 of the system chip 21. The timing controller may be TCON (Timer control register), and is capable of generating the driving signals and the timing signals controlling the display panel to display. The first method only relates to the integration in format. This method may simplify the structure of the display panel control system 200. However, the video signals have to be processed by the video controller 211 first, and the TCON may generate the driving signals and the timing signals. The second method relates to a complete integration. The video controller 211 may generate the driving signals and the timing signals directly when processing the video signals.

The driving control board 22 connects to the system chip 21 to obtain the driving signals and the timing signals, and the driving control board 22 may control the display panel to display in accordance with the driving signals and the timing signals.

Specifically, the system chip 21 incorporated with the TCON function is manufactured by the system ship manufacture, and the driving control board 22 is manufactured by the display panel manufacture.

When the system chip 21 obtains the driving signals and the timing signals, it is needed to consider the corresponding characteristics of the display panel. However, the system chip manufacture may not be able to understand the display panel manufacture. In addition, the system chip manufacture intends to manufacture the system chips of various forms in a batch manner.

Thus, it is important that the system chip 21 may obtain the parameters corresponding to the display panel. In the embodiment, the time parameter and the optical parameters of the display panel are stored within the driving control board 22 manufactured by the display panel manufacture. The system chip 21 may access the time parameter and the optical parameters via the driving control board 22. By analyzing the video signals, the time parameter and the optical parameters, the driving signals and the timing signals may be obtained.

Specifically, after the display panel control system is turned on, the system chip 21 may access the parameters within the driving control board 22. The driving control board 22 may store the time parameter and the optical parameters within the EEPROM. If the parameters need to be refreshed, the display panel manufacture may re-write the EEPROM.

The system chip 21 may transmit and receive the signals via the interfaces, and the types of the interface determine the types of the transmission signals. The system chip 21 includes a HDMI interface 213. The system chip 21 receives the video signals via the HDMI interface 213.

The system chip 21 also includes a P2P interface 212, and the system chip 21 connects with the driving control board 22 via the P2P interface 212.

The system chip 21 transmits the driving signals and the timing signals to the driving control board 22 via the interface, and receives the time parameters and the optical parameters within the driving control board 22 via the interface. The corresponding driving signals and the timing signals are of P2P format.

The P2P interface is a Point to Point data interface. By adopting the interface, fewer transmission lines are needed. In addition, compared to the signals of the mini-LVDS format, the signals of the P2P format are characterized by higher frequency, wider bandwidth, few transmission lines, and faster transmission speed.

With respect to each of the data lines of the display panel, the signal transmission time may include a display time and a blank time. As the driving signals and the timing signals are of the P2P format. The transmission speed of the signals of the P2P format is fast, and the driving signals may be controlled to be transmitted within the display time, and the timing signals may be controlled to be transmitted within the blank time. The transmission of the timing signals may not affect the transmission of the driving signals. If the driving data of the video signals has to be amended, the driving signals may be amended in a real-time manner, and each of the transmission line may be amended respectively.

With respect to a large-scale display panel, the display panel control system 200 may include at least two driving control boards 22. In order to simplify the interfaces of the driving control board 22 and the system chip 21, in the embodiment, at least two driving control boards 22 are connected in pairs. The system chip 21 connect one of the at least two driving control boards 22. The at least two driving control boards 22 connected in pairs are connected with each other via the P2P interface 221. This configuration may also contribute to a simplified structure. As the system chip 21 and the driving control board 22 are manufactured by different manufacture, if each of the driving control boards 22 has to directly engage with the system chip 21, a plurality of interfaces have to be provided on the system chip 21. This results in a difficult manufacturing process, complicated structure, and increasing cost. Thus, only one interface is configured therebetween.

The display panel control system 200 further includes a power board 23. The power board 23 connects with the system chip 21. The power board 23 process the power supply equaling to 220V so as to provide appropriate voltage for the display panel control system 200.

Figure 3:
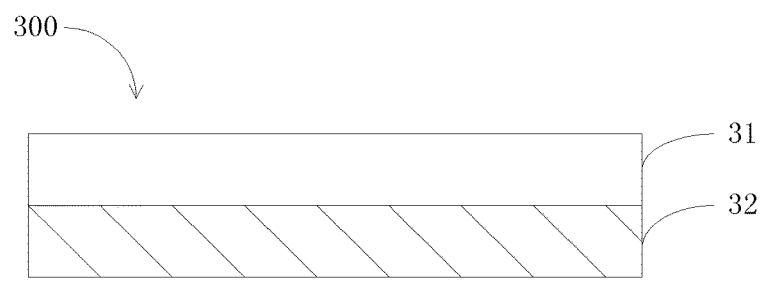
FIG. 3 is a schematic view of the display device in accordance with one embodiment.
Figure 4:
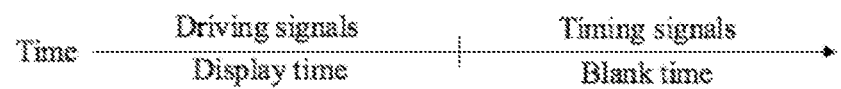
FIG. 4 is a diagram illustrating transmitting time periods of driving signals and timing signals in accordance with one embodiment.

FIG. 3 is a schematic view of the display device in accordance with one embodiment. The display device 300 includes a display panel 31 and a display panel control system 32. The display panel control system 32 controls the display panel 31 to perform display.

In view of the above, the display panel control system includes the system chip and the driving control board. The system chip is configured for receiving the video signals, and analyzing the video signals to obtain the driving signals and the timing signals. The driving control board controls the display panel to perform display in accordance with the driving signals and the timing signals. The system chip within the control system connects with the driving control board via the interfaces. Such configuration is simple, and the manufacturing cost is relatively low.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A display panel control system, comprising:
   a system chip is configured for receiving video signals and for analyzing the video signals to obtain driving signals and timing signals;
   a driving control board is configured for receiving the driving signals and the timing signals, and for controlling a display panel to display in accordance with the driving signals and the timing signals;
   the driving control board stores time parameters and optical parameters corresponding to the display panel;
   the system chip further reads the time parameters and the optical parameter, and analyzes the video signals, the time parameters and the optical parameter to obtain the driving signals and the timing signals;
   the system chip comprises at least one P2P interface, and the system chip connects with the driving control board via the P2P interface;
   wherein the driving signals are controlled to be transmitted to the driving control board within a display time, and the timing signals are controlled to be transmitted to the driving control board within a blank time.

2. The display panel control system as claimed in claim 1, wherein the driving control board stores the time parameter and the optical parameters within EEPROM.

3. The display panel control system as claimed in claim 1, wherein the driving signals and the timing signals are of P2P format.

4. The display panel control system as claimed in claim 1, wherein the system chip comprises at least one HDMI interface, and the system chip receives the video signals via the HDMI interface.

5. The display panel control system as claimed in claim 1, wherein the system further comprises at least two driving control boards, at least two driving control boards are connect in pairs, and the system chip connects to one of the at least two driving control boards.

6. The display panel control system as claimed in claim 5, wherein every two of the at least two driving control boards are connected by the P2P interface.

7. The display panel control system as claimed in claim 1, wherein the system further comprises a power board connecting with the system chip.

8. A display device, comprising:
   a display panel and a display panel control system controlling the display panel to display, the display panel control system comprises:
   a system chip is configured for receiving video signals and for analyzing the video signals to obtain driving signals and timing signals; and
   a driving control board is configured for receiving the driving signals and the timing signals, and for controlling the display panel to display in accordance with the driving signals and the timing signals;
   wherein the driving signals are controlled to be transmitted to the driving control board within a display time, and the timing signals are controlled to be transmitted to the driving control board within a blank time.

9. The display device as claimed in claim 8, wherein the driving control board stores time parameters and optical parameters corresponding to the display panel; and
   the system chip further reads the time parameters and the optical parameter, and analyzes the video signals, the time parameters and the optical parameter to obtain the driving signals and the timing signals.

10. The display device as claimed in claim 9, wherein the driving control board stores the time parameter and the optical parameters within EEPROM.

11. The display device as claimed in claim 8, wherein the system chip comprises at least one P2P interface, and the system chip connects with the driving control board via the P2P interface.

12. The display device as claimed in claim 11, wherein the driving signals and the timing signals are of P2P format.

13. The display device as claimed in claim 8, wherein the system chip comprises at least one HDMI interface, and the system chip receives the video signals via the HDMI interface.

14. The display device as claimed in claim 8, wherein the system further comprises at least two driving control boards, at least two driving control boards are connect in pairs, and the system chip connects to one of the at least two driving control boards.

15. The display device as claimed in claim 14, wherein every two of the at least two driving control boards are connected by the P2P interface.

16. The display device as claimed in claim 8, wherein the system further comprises a power board connecting with the system chip.

* * * * *